United States Patent
Khandhar

(10) Patent No.: US 10,635,811 B2
(45) Date of Patent: Apr. 28, 2020

(54) SYSTEM AND METHOD FOR AUTOMATION OF MALWARE UNPACKING AND ANALYSIS

(71) Applicant: SECUREWORKS CORP., Wilmington, DE (US)

(72) Inventor: Pallav R. Khandhar, Amsterdam (NL)

(73) Assignee: SecureWorks Corp., Wilmington, DE (US)

( * ) Notice: Subject to any disclaimer, the term of this patent is extended or adjusted under 35 U.S.C. 154(b) by 211 days.

(21) Appl. No.: 15/465,047

(22) Filed: Mar. 21, 2017

(65) Prior Publication Data

US 2018/0276382 A1    Sep. 27, 2018

(51) Int. Cl.
*G06F 21/56*    (2013.01)

(52) U.S. Cl.
CPC .......... *G06F 21/563* (2013.01); *G06F 21/564* (2013.01); *G06F 2221/034* (2013.01)

(58) Field of Classification Search
CPC ..... G06F 21/563; G06F 21/56; H04L 63/145; H04L 63/1416
See application file for complete search history.

(56) References Cited

U.S. PATENT DOCUMENTS

| | | | |
|---|---|---|---|
| 6,301,668 B1 | 10/2001 | Gleichauf et al. | |
| 7,779,472 B1* | 8/2010 | Lou | G06F 21/566 726/22 |
| 9,338,180 B2* | 5/2016 | Ramsey | H04L 63/1416 |
| 9,560,062 B2* | 1/2017 | Khatri | H04L 63/1425 |
| 2007/0140488 A1 | 6/2007 | Dharmaji et al. | |
| 2009/0055552 A1 | 2/2009 | Swildens | |
| 2014/0344931 A1* | 11/2014 | Edwards | G06F 21/562 726/23 |
| 2015/0319182 A1* | 11/2015 | Natarajan | G06F 21/53 726/24 |
| 2016/0275292 A1 | 9/2016 | Chestna | |
| 2017/0147815 A1* | 5/2017 | Pedersen | G06F 21/56 |

* cited by examiner

*Primary Examiner* — Ali S Abyaneh
(74) *Attorney, Agent, or Firm* — Larson Newman, LLP

(57) ABSTRACT

An information handling system includes a storage and a processor. The storage is configured to store malware samples and malware signatures. The processor is configured to unpack a malware sample, compare the malware sample to known malware families, extract a command-and-control domain, extract encryption keys and communication parameters, store a malware signature for the malware sample, the malware signature including information required to monitor a network for activity of the malware sample or detect the malware sample on another system, and provide the command-and-control server addresses, encryption keys, and communication parameters to a botnet tracker.

17 Claims, 3 Drawing Sheets

SYSTEM AND METHOD FOR AUTOMATION OF MALWARE UNPACKING AND ANALYSIS

FIELD OF THE DISCLOSURE

This disclosure relates generally to information handling systems, and more particularly to automation of malware unpacking and analysis.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a storage configured to store malware samples and malware signatures. A processor may unpack a malware sample, compare the malware sample to known malware families, extract a command-and-control domain, extract encryption keys and communication parameters, and store a malware signature for the malware sample. The malware signature includes information required to monitor a network for activity of the malware sample or detect the malware sample on another system. The processor may provide the command-and-control server addresses, encryption keys, and communication parameters to a botnet tracker.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
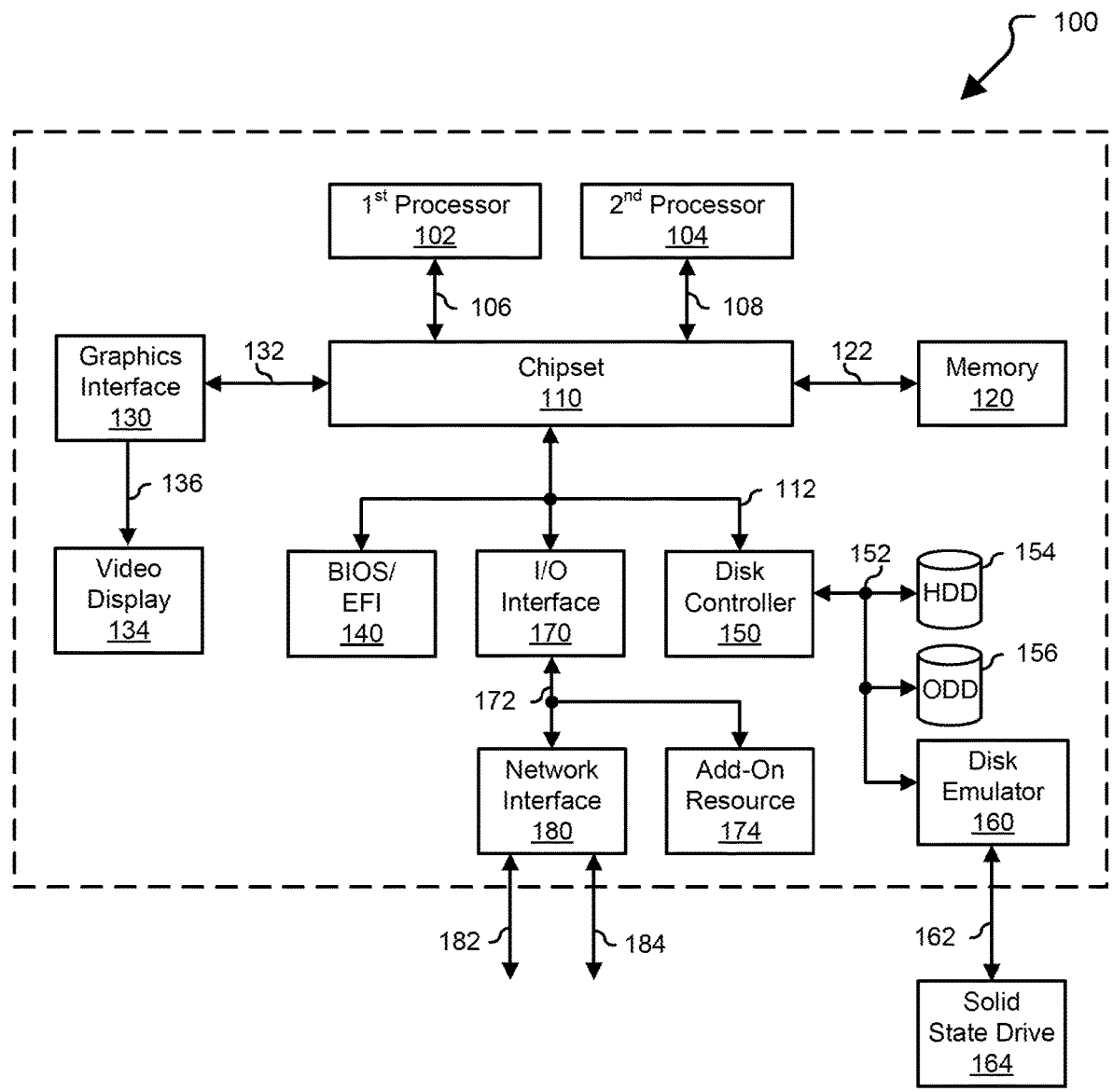
FIG. 1 illustrates a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Malware analysis can be a tedious process and can quickly become overwhelming with cyber criminals building and distributing hundred and thousands of new malware samples daily. Malware samples can be obfuscated, encrypted, and packed so that they reveal almost nothing during static analysis. Additionally, malware can hide multiple command-and-control (C2) servers or use a domain generation algorithm (DGA) to generate C2 domains, so that conventional behavior analysis of malware via sandboxes may only reveal information captured within a limited time period.

Traditional analysis, either by static analysis or by sandboxing, can provide limited information. Static analysis may not provide information about the malware activity when the information is obfuscated, encrypted, or packed. Behavioral analysis during sandboxing can only reveal malware activity that occurs during the time the sample was run in the sandboxing. The behavioral analysis may miss a portion of the C2 servers if the malware contacts only a subset of the C2 servers during the sandboxing period. Additionally, it can be difficult or impossible to recover encryption keys during behavioral analysis, as only the encrypted information is observed and require manual efforts to decode and decrypt network traffic to understand the malware behavior. Further, if the malware has a time triggered behavior change, behavior analysis may not identify the later behavior if the change isn't triggered during the sandboxing period.

Figure 2:
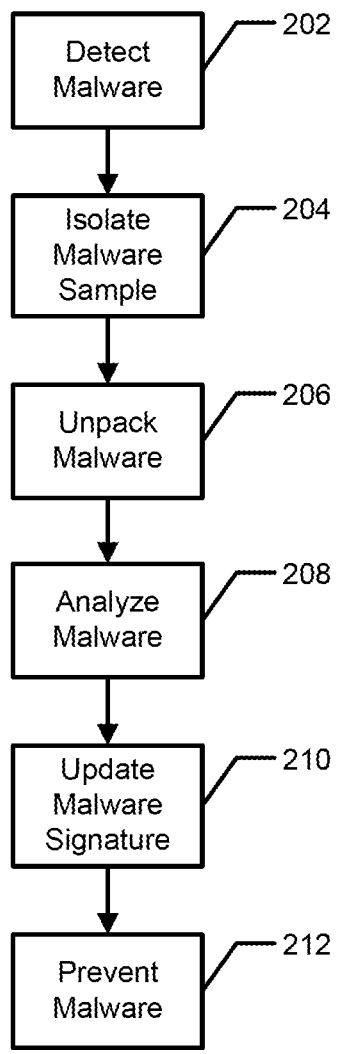
FIG. 2 depicts a flow diagram of a process for malware unpacking and analysis.

FIG. 2 is a flow diagram illustrating an exemplary method 200 of malware detection and prevention. At 202, malware can be detected. Various methods can be used to detect the presence of malware, such as monitoring network traffic for suspicious activity, monitoring system activity for suspicious events, scanning files for malware signatures, or any combination thereof. In various embodiments, scanning files can include scanning the files stored on a system, scanning files being transferred via email, scanning files being downloaded, such as through a web browser, or any combination thereof.

At 204, a sample of the malware can be isolated. For example, an infected file can be placed into quarantine. At 206, the malware sample can be unpacked. In various embodiments, a malware executable may be packed or compressed to reduce the size of the malware. A compressed executable may be faster to download and take up disk space. Additionally, compression of the malware can obfuscate the instructions making it harder to detect and analyze.

At 208, the unpacked malware can be analyzed. By analyzing the malware, information about the malware operation can be obtained. For example, the malware may communicate with one or more C2 servers for instructions. Instructions from the C2 server may serve to synchronize the activity of many infected systems, such as to coordinate a distributed denial of service (DDOS) attack. In various embodiments, multiple C2 server addresses may be used for redundancy and to obfuscate which address connects to the active C2 server. Additionally, the malware may have a DGA that sequentially generates a number of possible addresses for C2 servers. Additionally, encryption keys, campaign identifiers, botnet identifiers, request formats, and the like can be obtained from the executable.

The use of multiple C2 server addresses can make identifying and blocking C2 servers difficult when the primary analysis of the malware is from observation of the malware activity. For example, if the malware has addresses for multiple C2 servers and sequentially requests instructions from each one until it receives an instruction, observation of the activity may not identify all potential C2 server addresses. Blocking a known C2 server may result in the malware moving to the next C2 server address which may not have been identified and blocked. However, analyzing the malware executable to identify all of the C2 server addresses or obtain the DGA and seed can allow blocking of all of the potential C2 servers.

In various embodiments, the encryption keys, campaign identifiers, botnet identifiers, request formats, and the like can be used to monitor the communication between the C2 server and the malware, and through network traffic monitoring, identify infected systems and understand the extent of the infection.

At 210, the information obtained from the malware analysis can be used to create or update a malware signature, and at 212, the signatures can be used to block the spread of the malware or malicious activity caused by the malware. In various embodiments, the malware signatures can be used to detect the malware, such as when scanning files for the presence of malware. Once detected, the malware can be removed from infected systems. In other embodiments, the malware signature can be used to detect and block network activity caused by the malware, such as to spread to other systems, to communicate with a C2 server, or to participate in an attack. Additionally, malware related network traffic can be used to identify and isolate infected systems until the malware is removed.

Figure 3:
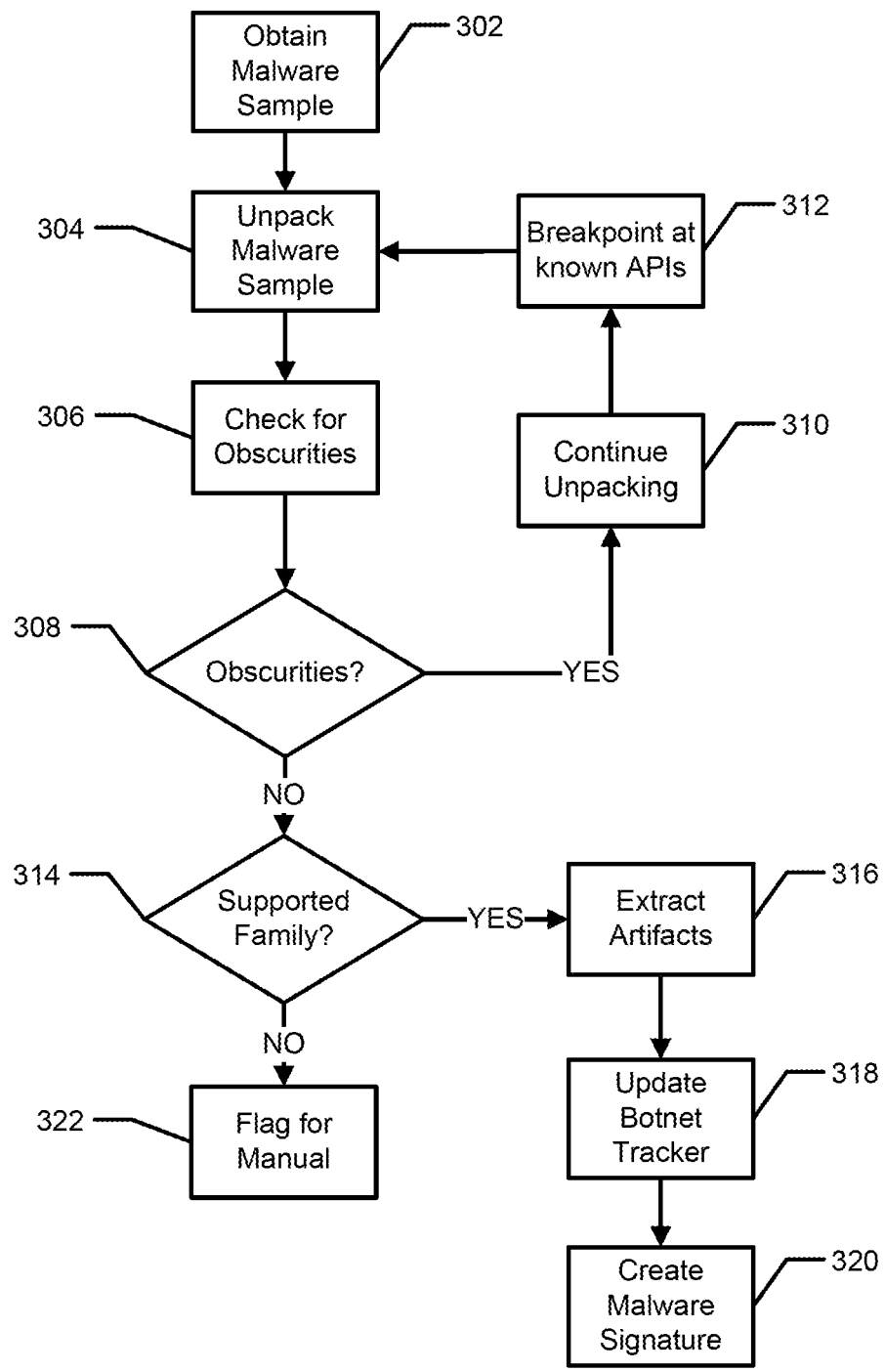
FIG. 3 depicts a flow diagram of a process for malware unpacking and analysis.

FIG. 3 shows a block diagram illustrating a method for automated analysis of malware. At 302, a malware sample can be obtained, and at 304, the system can unpack the malware sample. At 306, the system can check for obscurities in the unpacked malware. Obscurities can include additional packed executable components, possibly hidden in other locations of the malware file. Additionally, information such as C2 server addresses can be obscured with encryption. At 308, the system can determine if additional obscurities are present. When additional obscurities are detected, the system can continue unpacked and/or decrypting the malware sample, as illustrated at 310. The unpacking can continue until known application program interfaces (APIs) are detected at 312, at which point execution of the known API may be blocked. In various embodiments, the unpacked executable may be stepped through in a controlled and isolated environment to observe the malware behavior.

Alternatively, returning to 308, when no additional obscurities are detected, the system can determine if the malware is a member of a known malware family, as illustrated at 314. The malware can be matched to a family by comparing opcode patterns (patterns of machine language instructions), regular expression patterns, strings, API usage patterns, and mutexes (code to allow multiple program threads to share a same resource or prevent more than one instance or thread from simultaneously accessing/modifying the resource), and the like.

At 316, when the malware is determined to belong to a known family member, the system can extract artifacts. The artifacts can include the encryption key, C2 server addresses, campaign ID, Botnet ID, request format, and the like. Additionally, the artifacts can include unique signature of the malware that can be used to detect the presence of dormant malware on a system. The artifacts can be used to update a botnet tracker, as illustrated at 318, and can create a signature for the malware sample, as illustrated at 320.

Returning to 314, when the malware is not matched to a malware family, the malware can be flagged for manual analysis, as illustrated at 322. After manual analysis, the system can be updated with the new family information to enable the system to automatically analyze future family members.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a storage configured to store malware samples and malware signatures; and
   a processor configured to:
     unpack a malware sample;
     check for obscurities in the unpacked malware sample, wherein the obscurities include additional packed executable components;
     in response to no obscurities being within the unpacked malware sample, compare the malware sample to known malware families including comparing the use of application program interface usage patterns;
     extract a command-and-control domain;
     extract encryption keys and communication parameters;
     store a malware signature for the malware sample, the malware signature including information required to monitor a network for activity of the malware sample or detect the malware sample on another system; and
     provide the command-and-control server addresses, encryption keys, and communication parameters to a botnet tracker.

2. The information handling system of claim 1, wherein the communication parameters include a campaign identifier, a botnet identifier, a request format, or any combination thereof.

3. The information handling system of claim 1, wherein the command-and control domain includes a list of command-and-control addresses, a domain generation algorithm and seed, or any combination thereof.

4. The information handling system of claim 1, wherein comparing the malware sample to known malware families includes comparing an opcode pattern.

5. The information handling system of claim 1, wherein comparing the malware sample to known malware families includes comparing a regular expression pattern.

6. The information handling system of claim 1, wherein comparing the malware sample to known malware families includes comparing a mutex.

7. A method for automated malware analysis, comprising:
   obtaining a malware sample;
   unpacking the malware sample;
   checking for obscurities in the unpacked malware sample, wherein the obscurities include additional packed executable components;
   in response to no obscurities being within the unpacked malware sample, comparing the malware sample to known malware families including comparing the use of application program interface usage patterns;

extracting a command-and-control domain from the unpacked malware sample;

extracting encryption keys and communication parameters from the unpacked malware sample;

storing a malware signature for the malware sample, the malware signature including information required to monitor a network for activity of the malware sample or detect the malware sample on a system; and providing the command-and-control server addresses, encryption keys, and communication parameters to a botnet tracker.

8. The method of claim 7, wherein the communication parameters include a campaign identifier, a botnet identifier, a request format, or any combination thereof.

9. The method of claim 7, wherein the command-and control domain includes a list of command-and-control addresses, a domain generation algorithm and seed, or any combination thereof.

10. The method of claim 7, wherein comparing the malware sample to known malware families includes comparing an opcode pattern or a regular expression pattern.

11. The method of claim 7, wherein comparing the malware sample to known malware families includes comparing a mutex.

12. A non-transitory computer-readable medium including code that when executed by a processor causes the processor to perform a method, the method comprising:

obtaining a malware sample;

unpacking the malware sample;

checking for obscurities in the unpacked malware sample, wherein the obscurities include additional packed executable components;

in response to no obscurities being within the unpacked malware sample, comparing the malware sample to known malware families including comparing the use of application program interface usage patterns;

extracting a command-and-control domain from the unpacked malware sample;

extracting encryption keys and communication parameters from the unpacked malware sample;

storing a malware signature for the malware sample, the malware signature including information required to monitor a network for activity of the malware sample or detect the malware sample on a system; and providing the command-and-control server addresses, encryption keys, and communication parameters to a botnet tracker.

13. The non-transitory computer-readable medium of claim 12, wherein the communication parameters include a campaign identifier, a botnet identifier, a request format, or any combination thereof.

14. The non-transitory computer-readable medium of claim 12, wherein the command-and control domain includes a list of command-and-control addresses, a domain generation algorithm and seed, or any combination thereof.

15. The non-transitory computer-readable medium of claim 12, wherein comparing the malware sample to known malware families includes comparing an opcode pattern.

16. The non-transitory computer-readable medium of claim 12, wherein comparing the malware sample to known malware families includes comparing a regular expression pattern.

17. The non-transitory computer-readable medium of claim 12, wherein comparing the malware sample to known malware families includes comparing a mutex.

* * * * *